United States Patent [19]

Hulkko

[11] Patent Number: 4,856,080
[45] Date of Patent: Aug. 8, 1989

[54] CIRCUITRY FOR THE DIVERSITY UNIT IN AN FM RECEIVER FOR A TELEPHONE SYSTEM

[75] Inventor: Jaakko Hulkko, Oulu, Finland

[73] Assignee: Nokia-Mobira Oy, Salo, Finland

[21] Appl. No.: 119,469

[22] Filed: Nov. 10, 1987

[30] Foreign Application Priority Data

Nov. 18, 1986 [FI] Finland .................................. 864704

[51] Int. Cl.[4] .......................................... H04B 11/16
[52] U.S. Cl. ...................... 455/139; 455/52; 455/137; 455/276
[58] Field of Search ............... 455/132, 137, 139, 141, 455/208, 209, 272, 273, 276, 278, 10, 52, 260, 264; 375/100, 102

[56] References Cited

U.S. PATENT DOCUMENTS

| | | | |
|---|---|---|---|
| 4,386,435 | 5/1983 | Ulmer et al. | 455/139 |
| 4,406,017 | 4/1983 | Takahashi | 455/137 |
| 4,528,697 | 7/1985 | Nichols | 455/139 |
| 4,584,712 | 4/1986 | Isobe et al. | 455/273 |
| 4,593,413 | 6/1986 | Ozaki | 455/276 |
| 4,700,366 | 10/1987 | Henriksson | 375/100 |
| 4,731,801 | 3/1988 | Henriksson | 375/100 |
| 4,752,941 | 6/1988 | Takahara et al. | 375/100 |

FOREIGN PATENT DOCUMENTS 0060515  5/1977  Japan .................................... 455/139

Primary Examiner—Robert L. Griffin
Assistant Examiner—Curtis Kuntz
Attorney, Agent, or Firm—Armstrong, Nikaido, Marmelstein, Kubovcik & Murray

[57] ABSTRACT

A circuitry in a diversity unit of an FM receiver for a telephone system having at least two channels for receiving signals, and at least one phase-lock loop. The signals received by the channels which possibly differ from each in amplitude and frequency. Each channel comprises a mixer and a band-pass filter for forming an intermediate-frequency signal. The phase-lock loop has phase-lock branches operably connected between each mixer of the channels which comprises a frequency-phase comparator. The phase-lock loop equalizes the channel signals in phase and amplitude. The phase-lock loop further has a summation circuit for adding the channel signals which have been equalized. The frequency-phase comparator has a single phase-lock branch exiting therefrom along with a voltage-controlled oscillator connected to one of the mixers of one of the channels. The voltage-controlled oscillator has a switch on an input side thereof. The switch are for disconnecting the input side of the voltage-controlled oscillator from the frequency-phase comparator of the single phase-lock branch and for switching the voltage-controlled oscillator to a fixed and preset reference frequency. Coupled to another of one of the mixers of another set channels is a fixed-frequency oscillator and a signal-level sensing circuit which, in an event of slow fading the other channel, inputs a separate signal to the switch means of the voltage-controlled oscillator in order to switch the voltage-controlled oscillator to the fixed reference frequency.

3 Claims, 3 Drawing Sheets

CIRCUITRY FOR THE DIVERSITY UNIT IN AN FM RECEIVER FOR A TELEPHONE SYSTEM

BACKGROUND OF THE INVENTION

1. Field of the Invention

The present invention relates to the circuitry for the diversity unit in an FM receiver intended for a telephone system, the circuitry comprising at least two channels for receiving signals possibly differing from one another in both amplitude and frequency, each channel comprising a mixer and a band-pass filter for forming an intermediate-frequency signal, and the circuitry also includes at least one phase-lock loop which includes a phase comparator, as well as summation means for the summation, for the purpose of further detection, of the channel signals which have been equalized in phase and frequency.

2. Description of the Relevant Art

In cellular telephone systems, repeaters are usually required to have diversity reception capability for two or more channels. In the NMT 900 network to be opened, the repeater using diversity reception must be capable of functioning also in the event that in one of the receiving channels no signal is received even for a long period, or in the event that the signal is below the preset threshold level. This is the situation when, for example, one of the receiver antennas or the front section of the receiver has been damaged, or when the antenna is entirely missing.

Owing to the very high selectivity required of a receiver and to the real tolerances of the intermediate-frequency filters, the intermediate-frequency signals of the channels of the diversity receiver must be capable of being tuned in each channel separately precisely for the band of the filters in the channel in question. Thus the intermediate-frequency signals are not of the same frequency in the different branches.

Among the diversity reception principles presented in the literature, maximal gain predetection combining implemented for high or intermediate frequency is the one with the best efficiency values. In its technical implementation it is also by far the most complicated and most expensive. The next best is equal gain predetection combining, which in its technical implementation and price is more economical than the former.

One method of implementing the combining is to use a phase-lock for the phasing of the signals.

Equal gain predetection combining of signals of different intermediate frequencies can be implemented by using in both diversity channels separate phase-locks which are locked either to each other or to a fixed reference. The phase and frequency of the signals to be summated are equalized by means of mixers and voltage-controlled oscillators before the summation and detection. Either a fixed-frequency reference or the summated signal itself is used as the other input signal for the phase comparators.

FIG. 1 depicts such a known circuitry using a fixed-frequency reference, and in the circuitry of FIG. 2 the summated signal itself serves as the input signal. In the figures, the RFA and RFB signals may be, for example, the signals received from two receiver antennas, their frequencies, phases and amplitudes possibly differing from one another.

In the circuitries, there are the following blocks: $1a$ and $1b$ are mixers, $2a$ and $2b$ are band-pass filters, $3a$, $3b$ and $4a$, $4b$ are amplifiers, $5a$, $5b$ are phase comparators, $6a$, $6b$ are loop filters, $7a$, $7b$ are voltage-controlled oscillators, 8 indicates a summation circuit, 9 an amplifier, 10 a detector, 11 a loudspeaker, 12 a fixed-frequency oscillator, and 13 a phase shifting circuit (0°/90°).

The signal of each channel A, B is delivered, after filtering and amplification, to the phase comparator $5a$, $5b$, the output of which is dependent on the frequency difference and the phase difference between the input signals. The output signal of the phase comparator is forwarded via the loop filter to the voltage-controlled generator $7a$, $7b$, the output signal of which is mixed in the mixer $1a$, $1b$ with the input signal RFA, RFB. Owing to the phase-lock loops the signals will be of the same frequency and of the same phase before their summation in circuit 8, and their detection. In the case according to FIG. 1, the reference signal for the phase comparators is taken from the fixed-frequency crystal oscillator 12, whereas in the case according to FIG. 2 the summated signal itself is taken as the second input signal for the phase comparators after the amplifiers by means of feedback.

When a fixed crystal oscillator (FIG. 1) is used, the dimensioning of the loop filter so that the frequency modulation in the received signal will not be attenuated constitutes a problem. Because of modulation, the loop filter $6a$, $6b$ must be be very narrow. This makes the locking speed of the loop low, in which case at high fading speeds the phase-locks will not be able sufficiently rapidly to phase the signals coming from the various channels, and the efficiency of the diversity unit will decrease.

When the summated signal itself (FIG. 2) is used as the second input signal for the phase comparators $5a$, $5b$, the problem is how, in the static situation, to implement with sufficient precision the phase ratio (0° ... 90°) required by the phase comparators between the signals to be compared. Another problem is how the phase comparators $5a$ and $5b$ will behave when the intermediate-frequency signals are at different frequencies at the moment of start, in which case the signal in one input of the phase comparator contains intermodulation results and harmonic results of the intermediate frequencies, their mutual amplitude and frequency ratios varying as a function of the input level of the RF signal.

Thus the diversity receivers, known from the literature, using equal gain predetection combining prior to the phase-lock and detection function poorly when signals of different frequencies, containing phase or frequency modulation, are combined. Furthermore, the alternatives presented do not function optimally when one of the channels is completely devoid of a received signal or when the level of the received signal is below the set threshold level.

SUMMARY OF THE INVENTION

The object of the present invention is to eliminate the problems presented above and at the same time to provide a circuitry which is simple and economically competitive. In order to achieve this object, the invention is characterized in that from the phase comparator, the input signals of which are the intermediate-frequency signals of each channel, there is only one phase-lock branch, with a voltage-controlled oscillator, to the mixer of one channel; that on the input side of the voltage-controlled oscillator there are fitted switch means in such a way that the input of the oscillator can be disconnected from the phase comparator of the phase-lock branch and be switched to a fixed, preset reference frequency; that to the mixer of the second channel there is coupled a fixed-frequency oscillator and in the second channel there is additionally fitted one signal-level sensing circuit which, in the event that there appears slow fading in the channel, delivers a signal to the said switch means in order to switch the voltage-controlled oscillator to the fixed reference frequency.

These and other features of the invention will be understood upon reading of the following description along with the drawings.

According to one embodiment of the invention, in each channel there is fitted a signal-level sensing circuit which has delay means so that the circuit issues a control signal when its input signal remains below the preset threshold level for a certain period, the said control signal being delivered to a switch which disconnects the said channel from the summation.

Figure 2:
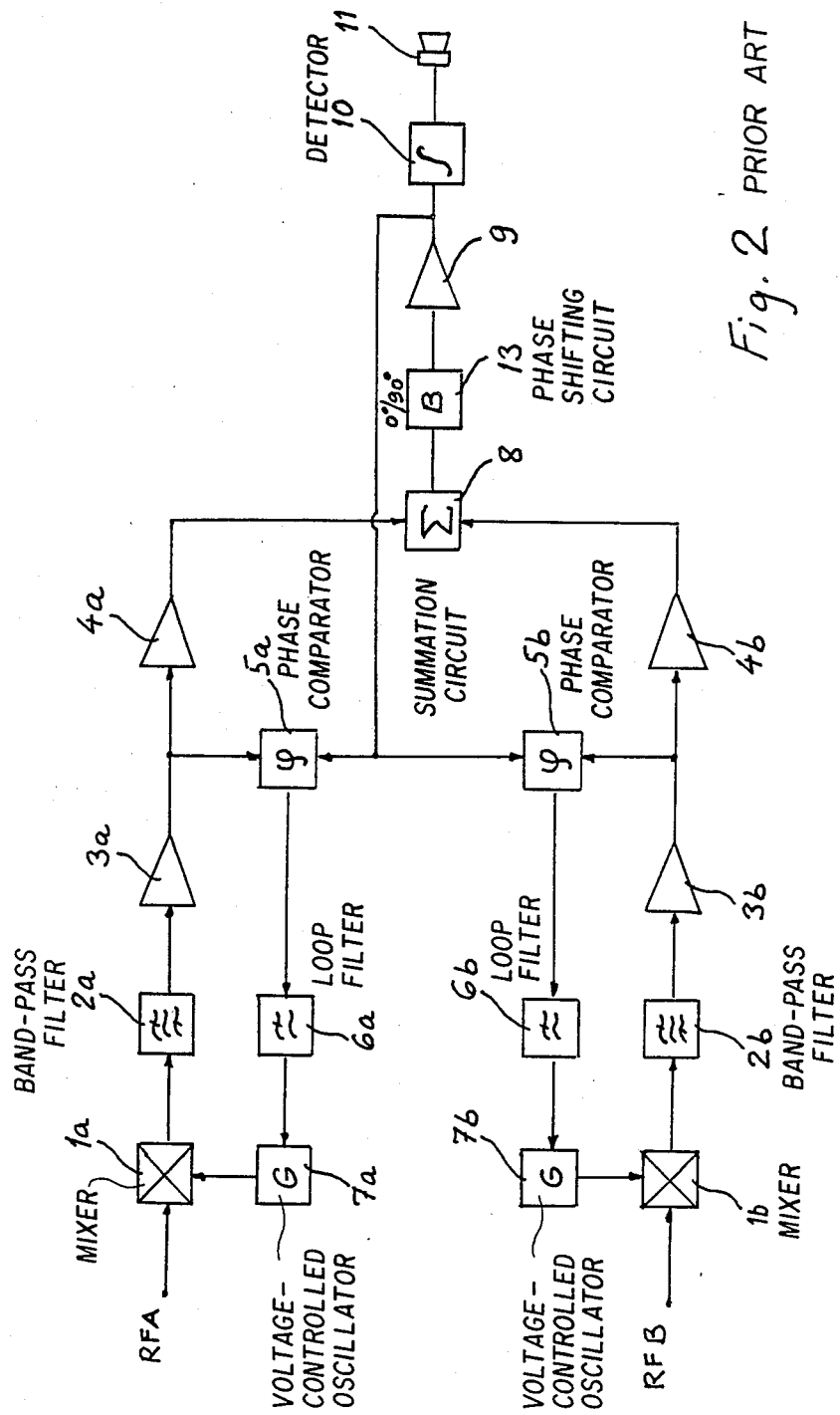
FIG. 2 shows a circuitry of the prior art whereby a summated signal serves as an input signal.
Figure 3:
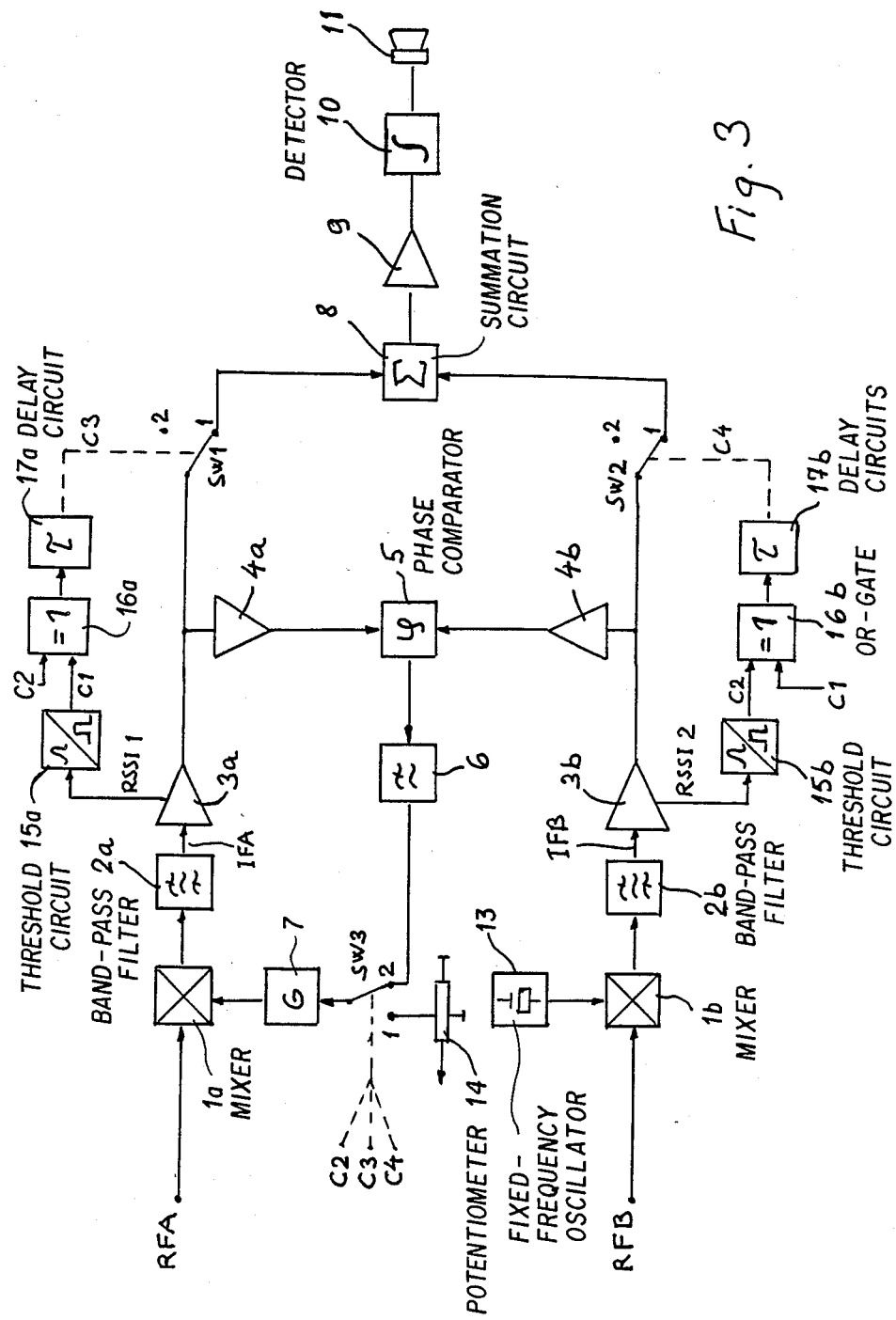
FIG. 3 shows a circuitry of this invention.

The invention is described below in greater detail in the form of an example and with reference to the accompanying drawings, in which FIGS. 1 and 2, already described, depict two alternative previously known ways of implementation, and FIG. 3 depicts in the form of a block diagram one circuitry according to the invention.

Figure 1:
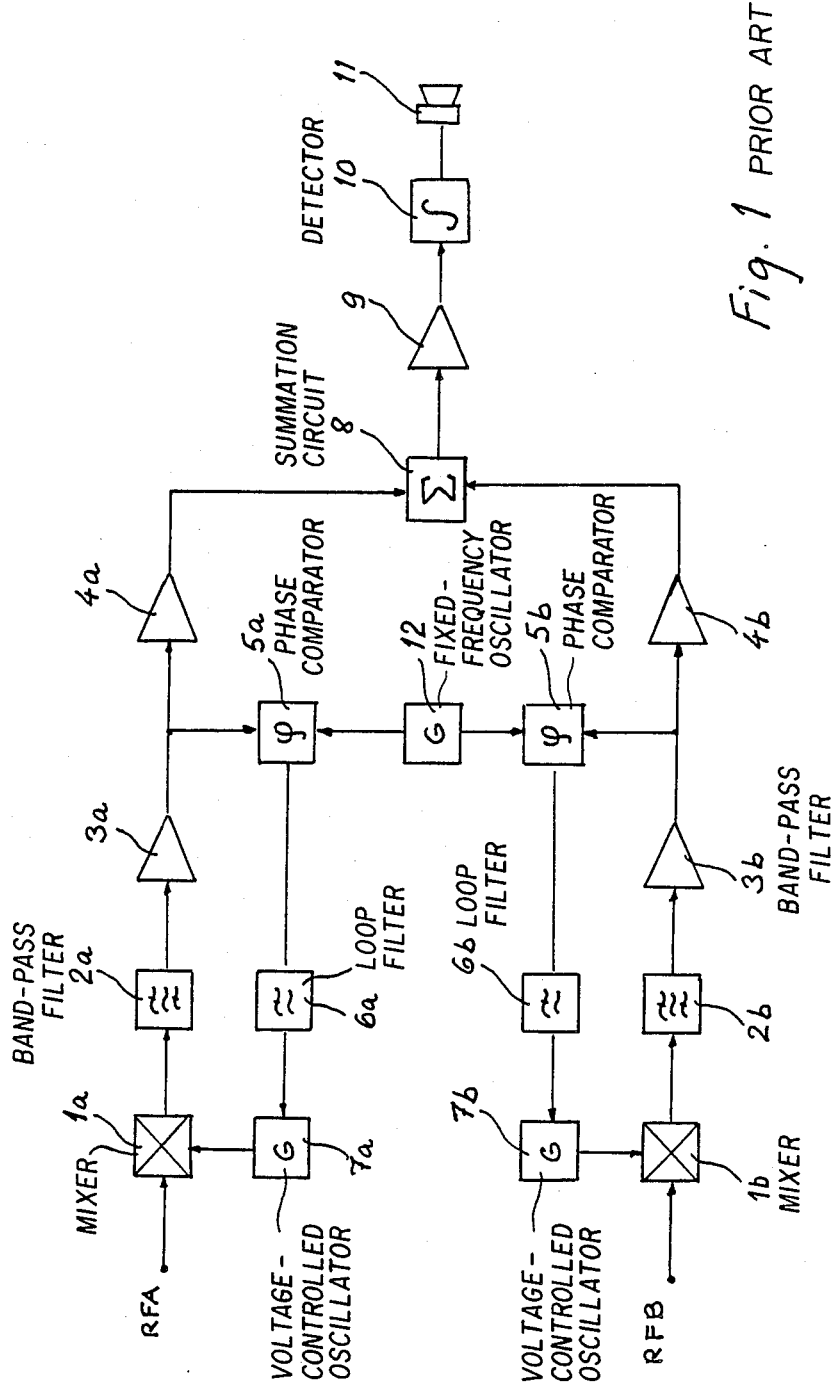
FIG. 1 shows a circuitry of the prior art using a fixed-frequency reference.

In FIG. 3, reference numerals 1a–4a, 1b–4b and 8–11 indicate sub-circuits similar to those in FIGS. 1 and 2 above, reference numeral 5 indicates the frequency-phase comparator of the only phase-lock loop in the circuitry, numeral 6 indicates a loop filter and numeral 7 a voltage-controlled oscillator. 13 is a fixed-frequency oscillator and 14 is a potentiometer by means of which the direct current to be controlled can be taken from a stable voltage source, not shown. Numerals 15a, 15b indicate each a threshold circuit by means of which an analog input signal is converted to either 0-level or 1-level, 16a, 16b are an absolute OR gates, and 17a, 17b are delay circuits. SW1, SW2 and SW3 are switches.

The RFA and RFB signals may be signals obtained from two receiver antennas or intermediate-frequency signals to be combined, received from two separate receivers. The frequencies, phases and amplitudes of the signals may differ from one another.

It is assumed first that in channels A and B the frequencies, phases and amplitudes of the signals differ from one another; however, the amplitude of neither channel is permanently considerably below the sensitivity of the channel. At this time switches SW1 and SW2 are in position 1 and switch SW3 in position 2.

It is assumed, furthermore, that at the time the apparatus is switched on the phase-locked loop made up of blocks 1a, 2a, 3a, 4a, 5, 6 and 7 is not phase-locked. Signals RFA and RFB are of the form $$RFA = a(t)\cos[w_1(t) + \phi m(t) + \alpha(t)]$$

$$RFB = b(t)\cos[w_3(t) + \phi m(t) + \beta(t)]$$

i.e. they contain time-dependent amplitudes a(t), b(t), input frequencies $w_1$, $w_3$, phase or frequency modulations $\phi m(t)$, and incidental phase angles $\alpha(t)$ and $\beta(t)$.

The frequency and phase of the voltage-controlled oscillator (VCXO) 7 are regulatable.

The intermediate-frequency signals IFA and IFB obtained after the mixing are the sum frequencies and difference frequencies of the input signals and local oscillators, from which frequencies the desired mixing result is filtered by means of the band-pass filter 2a, 2b.

Via the intermediate-frequency amplifier 3a, 4a and 3b, 4b the IFA and IFB are forwarded to the frequency-phase comparator 5, which issues to the voltage-controlled oscillator 7 a low-pass filtered correction voltage S which is proportional to the frequency difference and phase difference between the signals. In the phase comparison the modulations $\phi m$ are left out of the result of the comparison.

Thus the loop is locked and the frequencies and phases of the intermediate-frequency signals IFA and IFB are equalized, whereupon they can be forwarded via switches SW1 and SW2 to summation 8 and detection 9, 10. The frequency control range of the voltage-controlled oscillator 7 is such that it is capable of compensating for the frequency difference between IFA and IFB.

If the signal of channel A drops momentarily to a low level, it is detected as noise beside the signal detected in channel B. However, fading in channel A does not in any way affect the functioning of channel B.

As regards fading appearing in channel B, the phase-lock loop works as a low-pass filter which attenuates disturbances with respect to the output of channel A. At slow fadings, the signal strength indicator RSSI2 obtained from the amplifier 3b, momentarily brings the control voltage of the voltage-controlled oscillator 7 to a fixed level by means of switch SW3, under the control of signal C2 received from the threshold circuit 15b. Thus, also, fading in channel B does not substantially affect the functioning of channel A.

If in either channel A or channel B the amplitude drops below the preset threshold level for a long period (over $\tau s$), switch SW1 or SW2, depending on the channel in which the amplitude is low, disconnects the signal IFA or IFB from the summation means 8 and turns, via signal C3 resp. C4, the switch SW3 to position 1. Thus, in situations in which diversity reception is not possible or not in use, the signal coming from the noisy channel cannot enter the summation to worsen the signal being detected.

Switches SW1 and SW2 are controlled in such a way that they cannot be open (position 2) simultaneously even if the signal is below the preset threshold level in both channels.

The fixed control voltage set by means of the potentiometer 14 for the voltage-controlled oscillator 7 is a DC voltage such that the IFA frequency of the intermediate-frequency signal will be almost equal to the IFB frequency when, in the tuning situation, SW3 is in position 1 and the level in each channel is considerably above the sensitivity limit.

By using this structure, one entire phase-lock loop is dispensed with as compared with the structures presented in the literature.

Owing to the frequency-phase comparator, the signal frequencies of channels A and B may differ from one another. Also, in the comparison the modulations in the channels are cancelled in the control voltage of the voltage-controlled oscillator. The loop filter may thus be dimensioned for the desired noise band width and loop speed. The RSSI1 and RSSI2 signals may also be replaced by circuits measuring the carrier-to-noise ratio of the IFA and IFB signals.

The invention will most likely be used for implementing the diversity reception of the repeater in the NMT 900 cellular telephone system.

While the invention has been particularly shown and described in reference preferred embodiments thereof, it will be understood by those skilled in the art that changes in form and details may be made therein without departing from the spirit and scope of the invention.

I claim:

1. A circuitry in a diversity unit of an FM receiver for a telephone system, comprising:
    at least two channels for receiving signals at least one of differing from and similar to one another in amplitude and frequency, wherein each channel comprises a mixer and a band-pass filter for forming an intermediate-frequency signal; and
    at least one phase-lock loop having phase-lock branches operably connected between each mixer of said channels which comprises a frequency-phase comparator wherein phase-lock loop equalizes the channel signals in phase and amplitude, and at least one summation means for adding the channel signals which have been equalized,
    wherein said frequency-phase comparator has a single phase-lock branch exiting therefrom along with a voltage-controlled oscillator connected to one of said mixers of one of said channels,
    wherein said voltage-controlled oscillator has switch means on an input side thereof, said switch means are for disconnecting the input side of said voltage-controlled oscillator from said frequency-phase comparator of said single phase-lock branch and for switching said voltage controlled oscillator to a fixed and preset reference frequency,
    wherein coupled to another of said mixers of another set channels is a fixed-frequency oscillator and a signal-level sensing circuit which, in an event of slow fading in said another channel, inputs a separate signal to said switch means of said voltage-controlled oscillator in order to switch the voltage-controlled oscillator to said fixed reference frequency.

2. A circuitry according to claim 1, wherein each channel is fitted with a signal level sensing circuit having delay means so that the circuit outputs a control signal when its input signal remains below a preset threshold level for a certain period, said control signal being inputted to another switch means for disconnecting said channels from the summation means.

3. A circuitry according to claim 2, wherein the said another switch means of the channels are controlled so that, regardless of signal levels, at least one channel is connected via said switches to the summation means.

* * * * *